United States Patent
Seo et al.

(10) Patent No.: US 11,271,694 B2
(45) Date of Patent: Mar. 8, 2022

(54) METHOD FOR TRANSMITTING OR RECEIVING SIGNAL IN WIRELESS COMMUNICATION SYSTEM AND APPARATUS THEREFOR

(71) Applicant: LG ELECTRONICS INC., Seoul (KR)

(72) Inventors: Inkwon Seo, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 35 days.

(21) Appl. No.: 16/483,733

(22) PCT Filed: Feb. 2, 2018

(86) PCT No.: PCT/KR2018/001442
§ 371 (c)(1),
(2) Date: Aug. 5, 2019

(87) PCT Pub. No.: WO2018/143719
PCT Pub. Date: Aug. 9, 2018

(65) Prior Publication Data
US 2020/0028646 A1 Jan. 23, 2020

Related U.S. Application Data

(60) Provisional application No. 62/501,726, filed on May 4, 2017, provisional application No. 62/454,885, filed on Feb. 5, 2017.

(51) Int. Cl.
*H04L 5/00* (2006.01)
*H04W 72/04* (2009.01)

(52) U.S. Cl.
CPC ....... *H04L 5/0048* (2013.01); *H04W 72/0453* (2013.01)

(58) Field of Classification Search
CPC ... H04L 5/0048; H04L 5/0007; H04L 5/0091; H04W 72/0453
See application file for complete search history.

(56) References Cited

U.S. PATENT DOCUMENTS

| | | | |
|---|---|---|---|
| 2014/0185530 A1 | 7/2014 | Kuchibhotla et al. | |
| 2015/0043520 A1 | 2/2015 | Sun et al. | |

(Continued)

FOREIGN PATENT DOCUMENTS

| | | | |
|---|---|---|---|
| EP | 2922225 | 9/2015 | |
| WO | 2016072497 | 5/2016 | |
| WO | WO-2018004251 A1 * | 1/2018 | ........... H04L 5/0051 |

OTHER PUBLICATIONS

PCT International Application No. PCT/KR2018/001442, Written Opinion of the International Searching Authority dated May 28, 2018, 19 pages.

*Primary Examiner* — Saumit Shah
(74) *Attorney, Agent, or Firm* — Lee Hong Degerman Kang Waimey

(57) ABSTRACT

A method for receiving a downlink signal by a terminal in a wireless communication system includes the steps of: receiving, from a base station, a reference point of a system band and information on an operation band of the terminal corresponding to a part of the system band; determining a reference signal sequence for the operation band of the terminal with reference to the reference point of the system band; and receiving a downlink signal in the operation band of the terminal on the basis of the determined reference signal sequence, wherein the information on the operation band of the terminal includes an offset between the operation band of the terminal and the reference point of the system band.

(Continued)

The UE is capable of communicating with at least one of another UE, a UE related to an autonomous driving vehicle, a base station or a network.

15 Claims, 12 Drawing Sheets

(56) References Cited

U.S. PATENT DOCUMENTS

| | | | | |
|---|---|---|---|---|
| 2015/0117338 A1* | 4/2015 | Janis | ..................... | H04L 5/0048 |
| | | | | 370/329 |
| 2015/0230210 A1* | 8/2015 | Lee | ..................... | H04L 5/0007 |
| | | | | 370/329 |
| 2015/0249526 A1 | 9/2015 | Kim et al. | | |
| 2015/0341958 A1* | 11/2015 | Guo | ..................... | H04L 5/0051 |
| | | | | 370/329 |
| 2017/0180095 A1* | 6/2017 | Xue | ..................... | H04L 5/0048 |
| 2018/0183491 A1* | 6/2018 | Takeda | ..................... | H04B 7/12 |
| 2019/0280909 A1* | 9/2019 | Werner | ................ | H04L 5/0051 |

* cited by examiner

METHOD FOR TRANSMITTING OR RECEIVING SIGNAL IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2018/001442, filed on Feb. 2, 2018, which claims the benefit of U.S. Provisional Application No. 62/454,885, filed on Feb. 5, 2017, and 62/501,726, filed on May 4, 2017, the contents of which are hereby incorporated by reference herein in their entirety.

TECHNICAL FIELD

The present disclosure relates to a wireless communication system, and more particularly, to a method for transmitting or receiving a reference signal in a wireless communication system and apparatus therefor.

BACKGROUND ART

As more communication devices require greater communication capacity, the need of mobile broadband communication more enhanced than the conventional RAT (radio access technology) has been issued in a next generation communication system discussed recently. Also, massive MTC (Machine Type Communications) technology that provides various services anywhere and at any time by connecting a plurality of devices and things is one of main issues which will be considered in next generation communication. Furthermore, considering service/user equipment (UE) susceptible to latency and reliability, Ultra-Reliable and Low Latency Communication (URLLC) has been discussed in a next generation communication system.

As described above, a new RAT considering eMBB, mMTC and URLCC has been discussed for next generation wireless communication.

DISCLOSURE

Technical Problem

The object of the present disclosure is to provide a method for transmitting or receiving a reference signal efficiently and accurately in a wireless communication system and apparatus therefor.

The objects that could be achieved with the present disclosure are not limited to what has been particularly described hereinabove, and other objects that the present disclosure could achieve will be more clearly understood from the following detailed description.

Technical Solution

In an aspect of the present disclosure, provided is a method of receiving a downlink signal by a user equipment (UE) in a wireless communication system. The method may include: receiving information on a reference point of a system band and an operating band of the UE corresponding to a part of the system band from a base station; determining a reference signal sequence for the operating band of the UE with respect to the reference point of the system band; and receiving the downlink signal in the operating band of the UE based on the determined reference signal sequence. The information on the operating band of the UE may include an offset between the operating band of the UE and the reference point of the system band.

In another aspect of the present disclosure, provided is a user equipment (UE) for receiving a downlink signal in a wireless communication system. The UE may include a receiver and a processor configured to: receive information on a reference point of a system band and an operating band of the UE corresponding to a part of the system band from a base station through the receiver; determine a reference signal sequence for the operating band of the UE with respect to the reference point of the system band; and receive the downlink signal in the operating band of the UE based on the determined reference signal sequence through the receiver. The information on the operating band of the UE may include an offset between the operating band of the UE and the reference point of the system band.

In a further aspect of the present disclosure, provided is a method of transmitting a downlink signal by a base station in a wireless communication system. The method may include: transmitting, to a user equipment (UE), information on a reference point of a system band and an operating band of the UE corresponding to a part of the system band; determining a reference signal sequence for the operating band of the UE with respect to the reference point of the system band; and transmitting the downlink signal in the operating band of the UE based on the determined reference signal sequence. The information on the operating band of the UE may include an offset between the operating band of the UE and the reference point of the system band.

The reference point of the system band may be a starting point of the system band.

The determined reference signal sequence may be a partial sequence of a predetermined sequence applied to the entirety of the system band, wherein the partial sequence may be for the operating band of the UE.

The UE may determine, as the partial sequence, a part of the predetermined sequence generated with respect to the reference point, wherein the part of the predetermined sequence may correspond to the operating band of the UE specified by the offset.

The information on the reference point of the system band and the operating band of the UE may be received through higher layer signaling.

The UE may measure a downlink reference signal transmitted in the operating band of the UE using the determined reference signal sequence.

Advantageous Effects

According to the present disclosure, each UE can be provided with information on a reference point of a system band and its operating band, thereby obtaining a reference signal sequence corresponding to its operating band within the system band accurately and efficiently.

The effects that can be achieved with the present disclosure are not limited to what has been particularly described hereinabove and other advantages of the present disclosure will be more clearly understood from the following detailed description.

MODE FOR CARRYING OUT THE INVENTION

The following description of embodiments of the present disclosure may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. 3GPP LTE adopts OFDMA in downlink and adopts SC-FDMA in uplink. LTE-A (LTE-Advanced) is an evolved version of 3GPP LTE.

For clarity, the following description mainly concerns 3GPP based mobile communication system, but the technical idea of the present disclosure is not limited thereto. Specific terms used in the following description are provided to provide further understanding of the present disclosure and use of the terms may be modified to other forms within the scope of the present disclosure.

Prior to discussion of the New RAT, the 3GPP LTE/LTE-A system will briefly be described. The following description of 3GPP LTE/LTE-A may be referenced to help understanding of New RAT, and some LTE/LTE-A operations and configurations that do not conflict with the design of New RAT may also be applied to New RAT. New RAT may be referred to as 5G mobile communication for convenience.

3GPP LTE/LTE-A System

Figure 1:
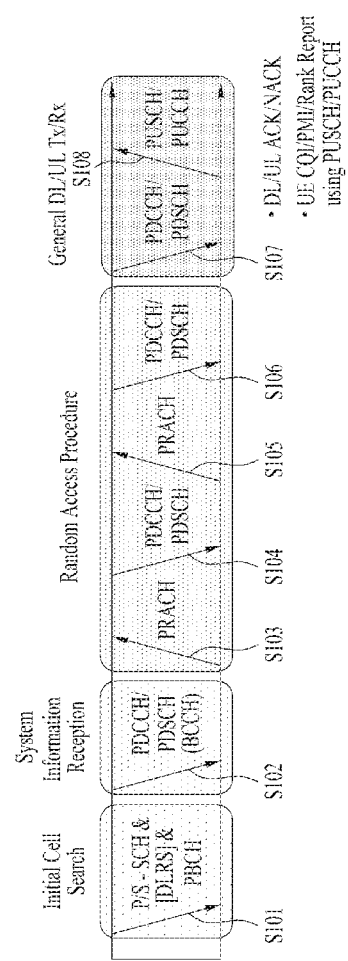
FIG. 1 is a diagram illustrating physical channels used for 3GPP LTE/LTE-A system and a general signal transmission method using the same.

FIG. 1 is a diagram illustrating physical channels used for 3GPP LTE/LTE-A system and a general signal transmission method using the same.

Referring to FIG. 1, if power of a user equipment (UE) is turned on or the UE enters a new cell, the UE may perform an initial cell search operation for matching synchronization with a base station (BS) and the like in operation S101. To this end, the UE may receive a primary synchronization channel (P-SCH) and a secondary synchronization channel (S-SCH) from the BS, may match synchronization with the BS and may then obtain information such as a cell ID and the like. Subsequently, the UE may receive a physical broadcast channel (PBCH) from the BS and may be then able to obtain intra-cell broadcast information. Meanwhile, the UE may receive a downlink reference signal (DL RS) and may be then able to check a DL channel state.

Upon completing the initial cell search, the UE may receive a physical downlink control channel (PDCCH) and a physical downlink shared control channel (PDSCH) according to the physical downlink control channel (PDCCH) in operation S102, thereby obtaining a detailed system information.

Thereafter, the UE may perform a random access procedure to complete access to the BS as in operations S103 to S106. To this end, the UE may transmit a preamble via a physical random access channel (PRACH) (S103) and may then receive a response message on PDCCH and a corresponding PDSCH in response to the preamble (S104). In case of contention-based random access, it may perform a contention resolution procedure such as a transmission (S105) of an additional physical random access channel and a channel reception (S106) of a physical downlink control channel and a corresponding physical downlink shared channel.

Upon performing the above-mentioned procedures, the UE may perform a PDCCH/PDSCH reception (S107) and a PUSCH/PUCCH (physical uplink shared channel/physical uplink control channel) transmission (S108) as a general uplink/downlink signal transmission procedure. Control information transmitted to a BS by a UE may be commonly named uplink control information (hereinafter abbreviated UCI). The UCI may include Hybrid Automatic Repeat and reQuest Acknowledgement/Negative-ACK (HARQ-ACK/NACK), Scheduling Request (SR), Channel Quality Indication (CQI), Precoding Matrix Indication (PMI), Rank Indication (RI) and the like. In the present specification, the HARQ-ACK/NACK is simply called HARQ-ACK or ACK (NACK) (A/N). The HARQ-ACK includes at least one of a positive ACK (simply, ACK), a negative ACK (NACK), DTX, and NACK/DTX. The UCI is normally transmitted on PUCCH. Yet, when both control information and traffic data need to be simultaneously transmitted, the UCI may be transmitted on PUSCH. Moreover, the UCI may be non-periodically transmitted in response to a request/indication made by a network.

Figure 2:
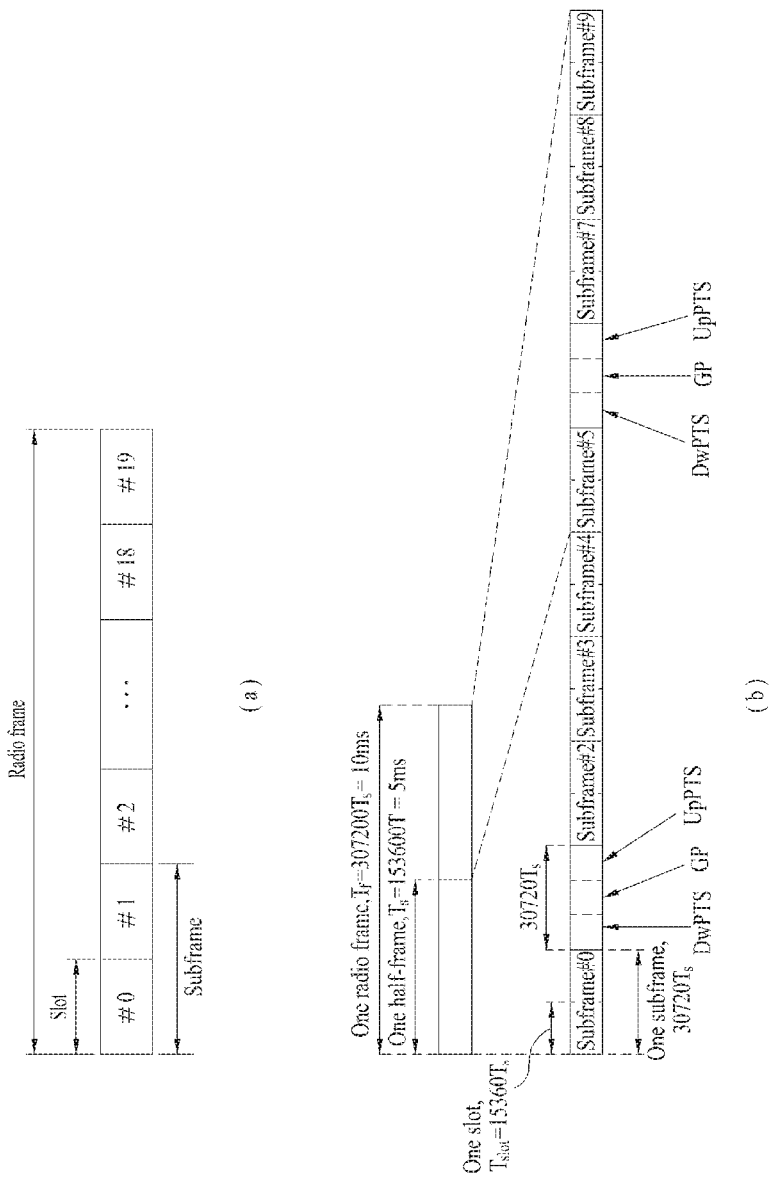
FIG. 2 is a diagram illustrating a structure of a radio frame for 3GPP LTE/LTE-A system.

FIG. 2 is a diagram illustrating a structure of a radio frame. Referring to FIG. 2, UL/DL (uplink/downlink) data packet transmission is performed in a unit of subframe in a cellular OFDM radio packet communication system. And, one subframe is defined as a predetermined time interval including a plurality of OFDM symbols. In the 3GPP LTE standard, a type-1 radio frame structure applicable to FDD (frequency division duplex) and a type-2 radio frame structure applicable to TDD (time division duplex) are supported.

FIG. 2(a) is a diagram for a structure of a type 1 radio frame. A DL (downlink) radio frame includes 10 subframes.

Each of the subframes includes 2 slots in time domain. And, a time taken to transmit one subframe is defined as a transmission time interval (hereinafter abbreviated TTI). For instance, one subframe may have a length of 1 ms and one slot may have a length of 0.5 ms. One slot may include a plurality of OFDM symbols in time domain and may include a plurality of resource blocks (RBs) in frequency domain. Since 3GPP LTE system uses OFDM in downlink, OFDM symbol is provided to indicate one symbol period. The OFDM symbol may be named SC-FDMA symbol or symbol period. Resource block (RB) may include a plurality of contiguous subcarriers in one slot.

The number of OFDM symbols included in one slot may vary according to a configuration of Cyclic Prefix (CP). The CP may be categorized into an extended CP and a normal CP. For instance, in case that OFDM symbols are configured by the normal CP, the number of OFDM symbols included in one slot may be 7. In case that OFDM symbols are configured by the extended CP, since a length of one OFDM symbol increases, the number of OFDM symbols included in one slot may be smaller than that of the case of the normal CP. In case of the extended CP, for instance, the number of OFDM symbols included in one slot may be 6. If a channel status is unstable (e.g., a UE is moving at high speed), it may use the extended CP to further reduce the inter-symbol interference.

When a normal CP is used, since one slot includes 7 OFDM symbols, one subframe includes 14 OFDM symbols. In this case, first maximum 3 OFDM symbols of each subframe may be allocated to PDCCH (physical downlink control channel), while the rest of the OFDM symbols are allocated to PDSCH (physical downlink shared channel).

FIG. 2(b) is a diagram for an example of a structure of a type 2 radio frame. The type-2 radio frame includes 2 half frames. Each of the half frames includes 5 subframes, DwPTS (downlink pilot time slot), GP (guard period) and UpPTS (uplink pilot time slot) and one subframe consists of two slots. The DwPTS is used for initial cell search, synchronization or channel estimation in a UE. The UpPTS is used for channel estimation in a BS and uplink transmission synchronization of a UE. The guard period is a period for eliminating interference generated in uplink due to multipath delay of a downlink signal between uplink and downlink.

The above-described structures of the radio frame are exemplary only. And, the number of subframes included in a radio frame, the number of slots included in the subframe and the number of symbols included in the slot may be modified in various ways.

Figure 3:
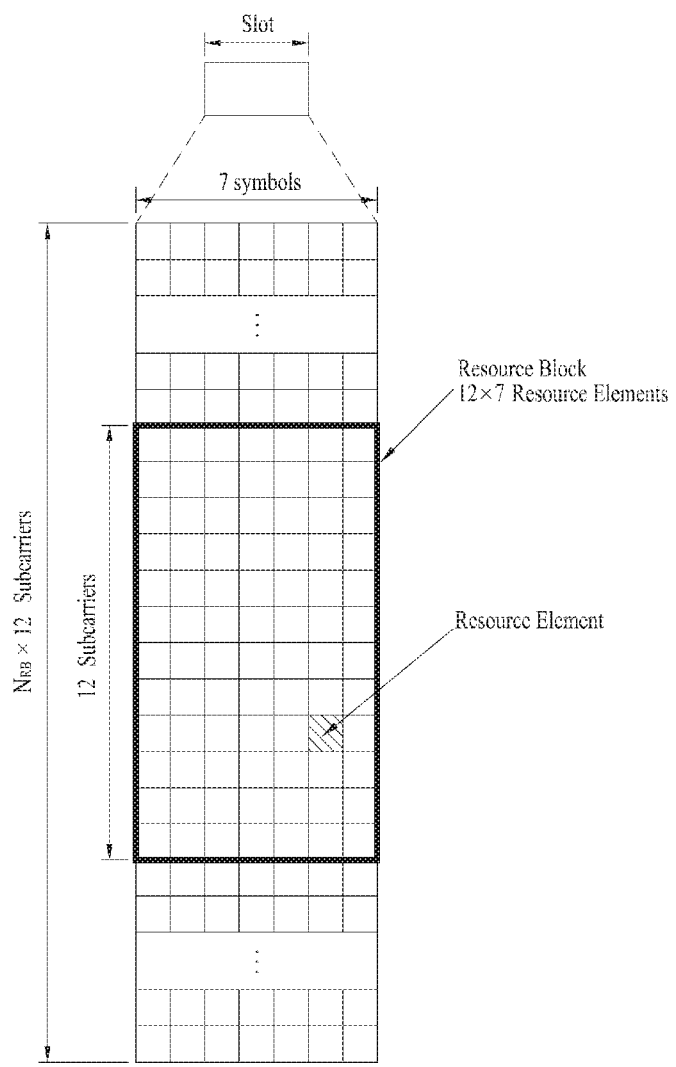
FIG. 3 is a diagram illustrating a resource grid for a downlink slot for 3GPP LTE/LTE-A system.

FIG. 3 is a diagram illustrating a resource grid for a downlink slot.

Referring to FIG. 3, one downlink (DL) slot may include a plurality of OFDM symbols in time domain. In particular, one DL slot exemplarily includes 7(6) OFDM symbols and one resource block (RB) includes 12 subcarriers in frequency domain. Each element on a resource grid is called a resource element (hereinafter abbreviated RE). One resource block includes 12×7(6) resource elements. The number NRB of resource blocks included in a DL slot may depend on a DL transmission bandwidth. And, the structure of an uplink (UL) slot may be identical to that of the DL slot and OFDM symbol is replaced by SC-FDMA symbol.

Figure 4:
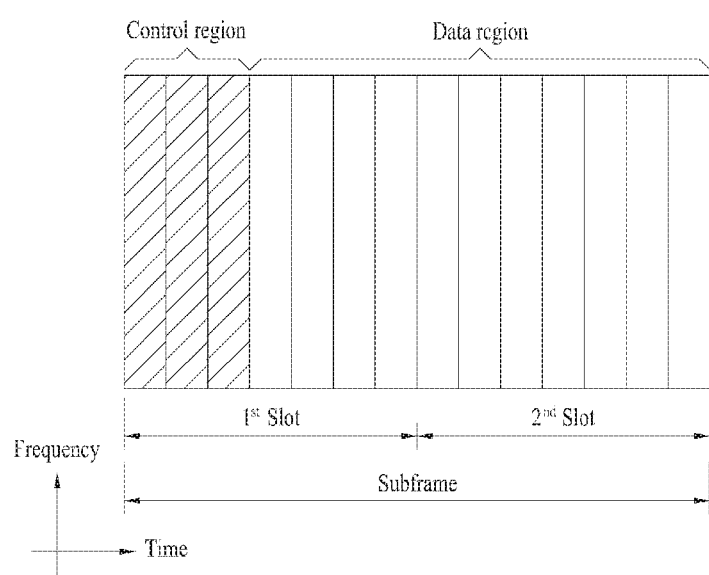
FIG. 4 is a diagram illustrating a structure of a downlink subframe for 3GPP LTE/LTE-A system.

FIG. 4 is a diagram illustrating a structure of a downlink subframe.

Referring to FIG. 4, maximum 3 (4) OFDM symbols situated at a fore part of a first slot of one subframe correspond to a control region to which control channels are allocated. The rest of OFDM symbols correspond to a data region to which PDSCH (physical downlink shared channel) is allocated. PDSCH is used for carrying a transport block (hereinafter abbreviated TB) or a codeword (hereinafter abbreviated CW) corresponding to the TB. The TB means a data block delivered from a MAC (medium access control) layer to a PHY (physical) layer on a transport channel. The CW corresponds to a coded version of the TB. Correlation between the TB and the CW may vary depending on a swapping. In the present specification, PDSCH, a TB, and a CW are used in a manner of being mixed. Examples of DL control channels used by LTE (-A) may include PCFICH (Physical Control Format Indicator Channel), PDCCH (Physical Downlink Control Channel), PHICH (Physical hybrid automatic repeat request indicator Channel) and the like. The PCFICH is transmitted in a first OFDM symbol of a subframe and carries information on the number of OFDM symbols used for a transmission of a control channel within the subframe. The PHICH carries a HARQ-ACK (hybrid automatic repeat and request acknowledgement) signal in response to an UL transmission. The HARQ-ACK response includes a positive ACK (simply, ACK), a negative ACK (NACK), DTX (discontinuous transmission), or NACK/DTX. In this case, HARQ-ACK, HARQ ACK/NACK, and ACK/NACK are used in a manner of being mixed.

Control information carried on PDCCH may be called downlink control information (hereinafter abbreviated DCI). The DCI includes resource allocation information for a UE or a UE group and different control information. For instance, the DCI includes UL/DL scheduling information, UL transmit (Tx) power control command, and the like.

Figure 5:
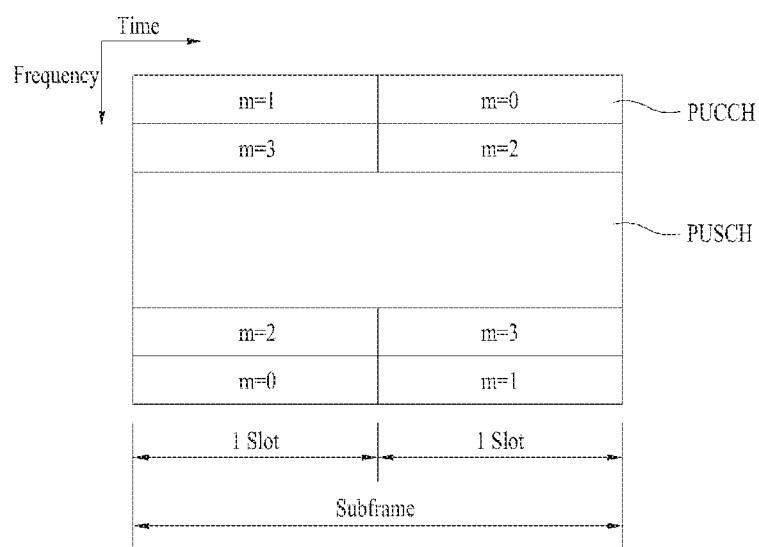
FIG. 5 is a diagram illustrating a structure of an uplink subframe for 3GPP LTE/LTE-A system.

FIG. 5 is a diagram illustrating a structure of an uplink subframe.

Referring to FIG. 5, an uplink subframe includes a plurality of slots (e.g., 2 slots). A slot may include a different number of SC-FDMA symbols according to a length of CP. A UL subframe may be divided into a control region and a data region in frequency domain. The data region includes PUSCH and can be used for transmitting a data signal such as an audio and the like. The control region includes PUCCH and can be used for transmitting UL control information (UCI). The PUCCH includes an RB pair situated at the both ends of the data region on a frequency axis and hops on a slot boundary.

The PUCCH can be used for transmitting control information such as SR (Scheduling Request), HARQ-ACK and/or CSI (Channel State Information).

New RAT

According to performance requirements for the new RAT, a subframe needs to be newly designed to satisfy low latency. The 3GPP LTE system has been designed in a frame structure having TTI of 1 ms, and a data request latency time for a video application is 10 ms. However, future 5G technology requires data transmission of lower latency due to the introduction of a new application such as real-time control and tactile internet, and aims to provide data latency reduced by 10 times as compared with the related art.

Self-Contained Subframe

Figure 6:
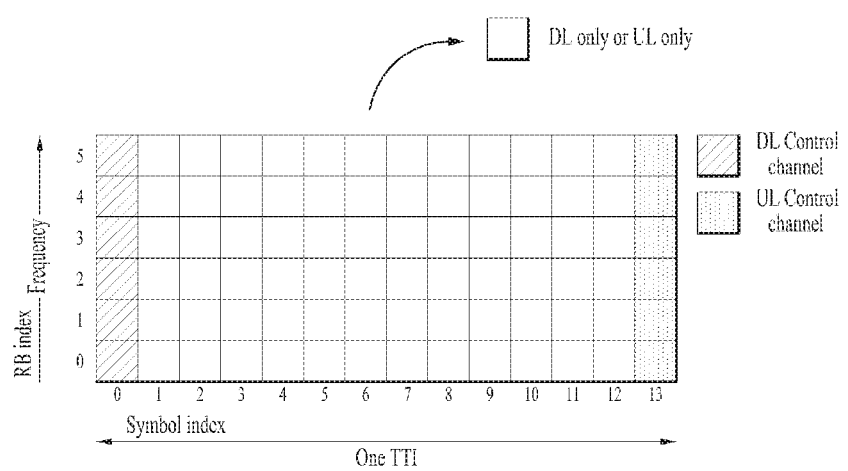
FIG. 6 is a diagram illustrating a structure of a self-contained subframe according to one embodiment of the present disclosure.

FIG. 6 is a diagram illustrating a structure of a self-contained subframe according to one embodiment of the present disclosure.

According to a TDD-based self-contained subframe structure, both a resource region for DL and a resource region for UL (e.g., DL and UL control channels) exist in one subframe.

In FIG. 6, hatched areas indicate downlink control regions and black colored areas indicate uplink control regions.

Areas having no mark may be used for downlink data transmission or uplink data transmission.

In this self-contained subframe structure, downlink (DL) transmission and uplink (UL) transmission are performed in due order within one subframe, whereby DL data may be transmitted and UL ACK/NACK may be received within one subframe. Similarly, UL data may be transmitted and DL ACK/NACK may be received within one subframe. As a result, the time required for data re-transmission may be reduced when an error occurs in data transmission, whereby latency of final data transfer may be minimized.

As described above, the expression "Self-Contained" may cover that a response (ACK/NACK) to DL or UL transmitted within the corresponding subframe is received within the corresponding subframe. However, since the time of one subframe or more may be required for transmission and response according to processing performance of the UE/eNB, the self-contained subframe will be defined as a subframe that may self-contain DL control information, DL/UL data and UL control information. That is, UL control information of Self-contained Subframe is not limited to HARQ-ACK information on DL data transmitted at the corresponding subframe.

This self-contained subframe structure requires a time gap that allows a BS and a UE to switch a transmission mode to a reception mode and vice versa. To this end, at least one OFDM symbol on which DL to UL switching is performed is set as a guard period (GP) in the self-contained subframe structure.

Although the self-contained subframe structure shown in FIG. 6 shows that a subframe is configured in the order of DL control region-data region-UL control region, the present disclosure is not limited thereto. For example, as another self-contained subframe structure, a subframe may be configured in the order of DL control region-UL control region-data region.

Also, for convenience of description, one subframe includes a total of 14 OFDM symbols, and one OFDM symbol is allocated to each of the DL control region and the UL control region. However, one or more OFDM symbols may be allocated to each of the DL control region and the UL control region. Similarly, the number of OFDM symbols included in one subframe may be changed.

Figure 7:
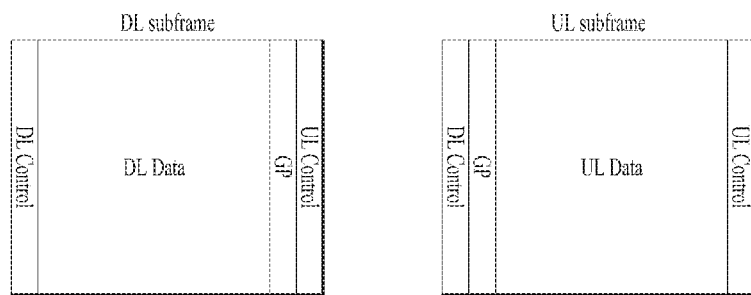
FIG. 7 is a diagram illustrating a downlink self-contained subframe and an uplink self-contained subframe according to one embodiment of the present disclosure.

FIG. 7 is a diagram illustrating a DL subframe and a UL subframe according to one embodiment of the present disclosure.

Referring to FIG. 7, the GP is located at the time when DL is switched to UL. For example, the GP is located between the DL data region and the UL control region at the DL subframe and is located between the DL control region and the UL data region at the UL subframe.

The GP may include Tx/Rx switching time of the eNB/UE and a timing advance (TA) for UL transmission of the UE.

Analog Beamforming

Since a wavelength becomes short in the field of Millimeter Wave (mmW), a plurality of antenna elements may be installed in the same area. That is, a wavelength is 1 cm in a band of 30 GHz, and a total of 100 antenna elements of a 2D array may be arranged in a panel of 5 by 5 cm at an interval of 0.5λ (wavelength). Therefore, as a plurality of antenna elements are used, beamforming gain is enhanced, and coverage increase and/or throughput improvement is expected.

In the mmW scheme, if a transceiver unit (TXRU) is provided per antenna element, it is possible to control a transmission power and phase per antenna element, whereby independent beamforming may be performed for each frequency resource. However, a problem occurs in that effectiveness is deteriorated in view of cost when TXRU is independently provided for all of 100 antenna elements.

Therefore, a scheme for mapping a plurality of antenna elements into one TXRU and controlling a beam direction by an analog phase shifter may be considered. However, since this analog beamforming scheme forms beams in only one beam direction with respect to a full band, a problem occurs in that frequency selective beamforming is not available.

As a hybrid type of digital beamforming and analog beamforming, a hybrid beamforming scheme for mapping a total of B TXRUs into a total of Q antenna elements (where, B<Q) may be considered. In this case, although there is a difference depending on a mutual connection scheme of B TXRUs and Q antenna elements, the number of beam directions that enable simultaneous transmission is limited to B or less.

NR Control Channel

In the NR system, a unit forming the basis of transmission of a control channel may be defined as a NR-resource element group (REG) and/or a NR-control channel element (CCE).

The NR-REG may correspond to one OFDM symbol in the time domain and one physical resource block (PRB) in the frequency domain. One PRB may correspond to 12 subcarriers, and one CCE may correspond to 6 REGs.

Hereinafter, a control resource set (CORESET) and a search space (SS) will be described in brief. The CORESET may be a set of resources for control signal transmission, and the SS may be a set of candidate control channels which a UE performs blind detection for. The SS may be configured in the CORESET. For example, assuming that one SS is defined in one CORESET, CORESETs may be defined for a common search space (CSS) and a UE-specific search space (USS), respectively. As another example, multiple SSs may be defined in one CORESET. For example, the CSS and USS may be configured in the same CORESET. In the following description, a CSS may mean a CORESET in which the CSS is configured, and a USS may mean a CORESET in which the USS is configured.

BS may transmit information on a CORESET to a UE. For example, the CORESET configuration of each CORESET and the time duration (e.g., 1, 2, or 3 symbol) thereof may be signaled. When interleaving is applied to a 1-symbol CORESET for CCE distribution, 2 or 6 REGs may be bundled. In the case of a 2-symbol CORESET, 2 or 6 REGs are bundled and time-first mapping may be applied. In the case of a 3-symbol CORESET, 3 or 6 REGs are bundled and time-first mapping may be applied. When REG bundling is performed, a UE may assumed that the same precoding is applied to a corresponding bundling unit.

Reference Signal for New RAT

In the LTE system, radio link availability is measured based on PDCCH decoding performance, and such a process is defined as radio link monitoring (RLM). If a UE detects no control channel in a subframe even though the UE performs blind decoding for a control channel, the UE may not determine whether there is no control channel transmitted in the corresponding subframe or although a control channel is transmitted, the control channel is not detected due to an unstable radio link. To solve this problem, in the LTE RLM, the PDCCH decoding performance is estimated by mapping the measurement result of a cell-specific reference signal (CRS) such as reference signal reception power (RSRP) and reference signal reception quality (RSRQ) with the PDCCH decoding performance That is, the radio link availability is determined by estimating the control channel decoding performance based on a range to which the measurement result belongs.

<Additional Reference Signal>

To enhance the flexibility of resource use, the NR system may not use an RS which is transmitted in every subframe and over the whole band such as a CRS of the LTE. Thus, the NR may require an additional RS for computing the performance of a control channel.

An embodiment of the present disclosure proposes to introduce an RS for RLM to the NR system. The configuration of the corresponding RS may be signaled by the network. For convenience of description, such an RS is referred to as an additional RS (ARS).

The RS configuration may be broadcast on a broadcast channel. Alternatively, the corresponding RS information may be signaled during an initial access procedure or in the form of system information. Further, the RS configuration may be indicated on a UE common channel or a UE-group common channel or through UE-dedicated signaling.

For example, the configuration of an ARS may include at least one of: (i) a time/frequency resource on which the ARS is transmitted and (ii) an ARS pattern.

(i) Time/frequency resource on which ARS is transmitted: As information on a time-domain resource, a subframe set in which the ARS is transmitted (or an ARS transmission periodicity), an ARS transmission symbol(s) in a subframe, etc. may be included. In addition, information on a frequency range in which the ARS is transmitted may be included as information on a frequency-domain resource.

(ii) ARS pattern: When multiple ARS patterns are defined, the network may signal to a UE an actually applied ARS pattern. For example, the ARS pattern may include at least one of: the number of ARS antenna ports; the number of REs for each antenna port; and information on an ARS mapping pattern. For example, if multiple locations are defined for ARS REs calculated by the number of ports and the number of REs per port (for example, if two or more ARS RE sets are specified by the number of ports and the number of REs per port), the information on the ARS mapping pattern may be signaled. In addition, if frequency shift (v-shift) is applied to the ARS to reduce inter-cell interference, a v-shift related parameter may also be included.

Some of the above-described information may be fixed by predefinition. For example, it may be predefined that the ARS is transmitted in a specific frequency region of a subframe or slot in which a synchronization signal is transmitted. As another example, when a radio frame is defined as sets of subframes and slots and each of the subframes and slots has its own index as in the LTE, it may be predefined that the ARS is transmitted in a specific frequency region of the first OFDM symbol of a specific subframe(s) or slot(s) of each frame or each periodic frame.

Meanwhile, multiple ARS configurations may be simultaneously applied. For example, when UEs (e.g., a wideband UE, a narrowband UE, etc.) having different operating bandwidths (BWs) (e.g., bandwidth parts) coexist, the network may transmit ARSs with different BWs according to UE categories using multiple ARS configurations.

On the contrary, only one ARS configuration may be defined with respect to the BW of a narrowband UE. For example, the ARS may be transmitted in a narrow band. In this case, a wideband UE estimates a wideband channel based on the narrowband ARS, and as a result, the control channel estimation performance of the wideband UE may be degraded.

Therefore, the network may need to transmit ARSs using multiple ARS configurations.

In addition, the ARS may be used to determine radio link failure (RLF). Therefore, the ARS needs to be always transmitted in a resource region configured for ARS transmission. For example, a UE may assume that the ARS is always transmitted in the resource region configured for the ARS (e.g., an ARS resource indicated by the ARS configuration).

<Control Channel Operation on ARS Slot>

Hereinafter, UE/BS operation will be described regarding a control channel in a slot where an ARS is transmitted. Although it is assumed that the ARS is transmitted in the first OFDM symbol of a subframe (or slot) for ARS transmission for convenience of description, the present disclosure is not limited thereto and covers a case in which another ARS configuration is applied.

As described above, an NR control channel carries control information, and a CORESET capable of transmitting the NR control channel may be configured for at least one UE. In addition, an SS where a UE performs blind decoding may be defined using resources in each CORESET or resources in different CORESETs.

According to an embodiment of the present disclosure, each CORESET may be configured to have different characteristics for flexible system operation. For example, each CORESET may use a different RS scrambling parameter. As a result, UE-transparent dynamic transmission/reception point selection (DPS) (e.g., CoMP, coordinated multi-point, etc.) may be performed. As another example, a different transmission scheme, a different resource mapping scheme, or a different PRB bundling size may be used for each CORESET.

The resource mapping scheme applied to the CORESET may include a scheme of mapping a low resource unit (e.g., REG, CCE, etc.) to a high resource unit (e.g., CCE, PDCCH, etc.), for example, REG-to-CCE mapping, CCE-to-PDCCH mapping, etc. In addition, the resource mapping scheme may include localized/distributed mapping, time-first mapping, frequency-first mapping, etc.

In addition, the time-first/frequency-first mapping may mean that mapping is performed first either in the time domain or in the frequency domain when a CCE is composed of REGs or a PDCCH is composed of CCEs.

The network determines the configuration of each CORESET and informs a UE of one or multiple CORESETs. In this case, each CORESET configuration may include time/frequency information on each CORESET. When multiple CORESETs are configured, the configuration of an SS, for example, how SSs for individual UEs are distributed in each CORESET or how SSs for each CORESET are configured may also be signaled.

A UE may configure an SS by considering the characteristics of a given CORESET.

In the following, control channel transmission and reception on a resource where the configurations of a CORESET overlaps with that of an ARS when the CORESET and the ARS are separately configured will be described.

For example, when a resource indicated by the CORESET configuration overlaps with a resource indicated by the ARS configuration, the ARS may be used for demodulation of a control channel on the overlapping resource. For instance, a resource for transmitting an RS (e.g., a DMRS for a control channel) and a resource for transmitting control information according to the CORESET configuration may be rate-matched for a resource for transmitting an ARS.

(i) Transmission Scheme on Overlapping Resource

For transmission, a beamforming transmission scheme or a transmit diversity scheme may be used. However, the present disclosure is not limited thereto. Since an ARS act as a common RS, the transmit diversity scheme is preferred than the beamforming operation. Since the beamforming operation may be performed UE-specifically or UE-group-specifically, the common RS is not suitable for the corresponding transmission scheme. The ARS configuration when the transmit diversity scheme is used will be described later.

For example, if a CORESET configured for a UE overlaps with an ARS transmission region, the UE may use the transmit diversity scheme in the overlapping region (or for the corresponding CORESET) regardless of the configuration of the CORESET.

As another example, a UE may apply a transmission scheme based on a CORESET configuration. The UE may assume that the transmission scheme based on the CORESET configuration is also applied to a resource on which an ARS is transmitted. However, if UE-dedicated beamforming is applied, the UE may assume that the corresponding transmission scheme is not applied to an RE on which the ARS is transmitted. It may be predefined that channel estimation for control information transmitted in an REG where the ARS is transmitted is performed based on an RS to which the UE-dedicated beamforming is applied.

Information indicating a transmission scheme to be used by a UE (e.g., a transmit diversity scheme using an ARS, a CORESET-specific transmission scheme, etc.) may be predefined or included in a CORESET configuration.

(ii) RS Configuration on Overlapping Resource

According to an embodiment of the present disclosure, an ARS configuration may be prioritized over an RS configuration for each CORESET.

The RS configuration determination method may be used together with the above-described method of determining a transmission scheme. For example, when an ARS-based transmit diversity scheme is used, a UE may use an ARS and assume that there is no RS except the ARS. When a transmission scheme based on a CORESET configuration is used, the UE may assume that an RS defined by the CORESET configuration is used.

As another example, an ARS may be first mapped in a resource region configured for the ARS. For example, the ARS may be transmitted on a fixed resource even if a separate RS for control information demodulation is transmitted according to a CORESET-specific transmission scheme.

An SS to be configured in a subframe (or slot) in which the ARS is transmitted may be predefined. For example, a UE may recognize a frequency region in which the ARS is transmitted as one CORESET. In addition, a CSS for common control information (e.g., paging, a random access response, a system information block, transmit power control, etc.) may be configured in the corresponding CORESET. In this case, the characteristics of the corresponding CORESET may be predefined. For example, it may be predefined that an RS configuration complies with an ARS configuration and a transmit diversity scheme is applied for transmission.

Additionally, a CORESET for a USS may be configured in the subframe (or slot) in which the ARS is transmitted. In this case, the CORESET for the CSS may overlap (partially) with the CORESET for the USS. The CORSET for the USS may be a CORESET configured cell-specifically or UE/UE-group-specifically regardless of the ARS, and the characteristics of the corresponding CORESET may be determined according to the proposed method. In addition, the USS existing in the subframe (or slot) in which the ARS is transmitted (i.e., the USS formed in the frequency region in which the ARS is transmitted) may be used for fallback operation.

<Wideband RS>

As described above, an ARS may be transmitted for RLM. In addition, the UE operation is described regarding a control channel in a slot in which an ARS is transmitted. In the following, a method of transmitting a control channel RS in a wide band will be described.

In the NR, since a downlink control channel operates based on a DMRS, the channel estimation performance thereof may be degraded compared to that of an LTE PDCCH. To compensate for the degraded channel estimation performance, PRB bundling may be considered. However, the transmission of information that requires wide coverage such as common control information may still have low performance.

Therefore, an embodiment of the present disclosure proposes to transmit an RS on an NR-PDCCH in a wide band periodically or if necessary. Such an RS is referred to as a wideband RS. A UE may use the entire region in which the wideband RS is transmitted for channel estimation. In addition, no DMRS may be transmitted in a resource region in which control information is transmitted since a DMRS is used for the NR-PDCCH, but the wideband RS may be transmitted regardless of whether the control information is transmitted.

The wideband RS may be used for the following purposes: channel estimation performance improvement, RLM, and tracking (e.g., time/frequency).

When the wideband RS is used for the RLM, the link quality (e.g., SNR) for estimating NR-PDCCH demodulation performance may be measured using the wideband RS, similar to the above-described ARS.

When the wideband RS is used for the channel estimation, a UE may perform the channel estimation using the entire region in which the wideband RS is transmitted regardless of locations of candidate control channels if the UE intends to perform blind decoding in the region in which the wideband RS is transmitted. This may be interpreted to mean that the wideband RS has the characteristics of a shared RS. For example, UEs performing blind decoding in the region in which the wideband RS is transmitted may share the same wideband RS.

When the wideband RS is used for the time/frequency tracking, a UE may adjust a time/frequency offset based on the wideband RS. For example, the UE may adjust a frequency error caused by transmission delay or a difference between oscillators using the wideband RS.

For wideband RS transmission, the following information may be indicated to a UE through higher layer signaling. Alternatively, information on the wideband RS transmission may be transmitted during an initial access procedure (for example, through a PBCH, an SIB, etc.).

(i) Wideband RS Transmission Periodicity

The network may signal whether the wideband RS is transmitted periodically or aperiodically and the periodicity of wideband RS transmission. In this case, a UE may perform measurement on a resource in which the wideband RS is transmitted even though the resource is not a resource for monitoring a control channel.

As another example, a UE may assume that a wideband RS is transmitted on a resource where a CSS is configured. In this case, the transmission BW of the wideband RS may be equivalent to the CSS, or it may be determined according to a wideband RS transmission BW configuration method, which will be described later. For example, when a CORESET is configured to include the CSS, a UE may assume that the transmission periodicity of the corresponding CORESET is equal to that of the wideband RS.

(ii) Wideband RS Transmission Bandwidth

UE Minimum BW: A wideband RS may be transmitted based on a UE minimum BW supported by the NR. It is advantageous in that both a narrowband UE and a wideband UE can monitor the same wideband RS. However, since the wideband UE monitors a part of the actually used BW, the accuracy and reliability of measurement may be degraded.

Common CORESET BW: A wideband RS may be transmitted in the BW of a CORESET (i.e., a resource region in which a CSS is defined) where a UE should check whether control information is transmitted. In this case, the UE may apply RLM for monitoring control channel decoding performance, and thus the channel estimation performance for common control information may be improved. For example, it may be assumed that the wideband RS is always applied to a common CORESET configured by a PBCH. When the wideband RS is transmitted in a common CORESET BW, the network groups UEs having the same operating BW and then transmit the wideband RS for each group. In this case, it is desirable that each group has no overlapping wideband RS transmission resource. However, if wideband RS transmission resources overlap, the network may allow each UE to recognize which part of the wideband RS a region monitored by each UE belongs to by transmitting information on a region in which the wideband RS is transmitted (e.g., the starting position of a sequence) to each UE.

System BW: The network may transmit the wideband RS over the whole system BW. In this case, the best performance is expected in terms of channel estimation and RLM. Meanwhile, for UEs unable to cover the system BW, information on the wideband RS needs to be transmitted in the frequency domain. For example, the network may indicate the system BW and signal the starting position of the system BW, an offset between UE operating BWs (e.g., a frequency-domain offset), etc. Upon receiving the information, a UE may measure the wideband RS or perform the channel estimation using the wideband RS in its operating BW or a BW allowed by its RF.

Configurable BW: The network may indicate to a UE or a UE group a BW for transmitting a wideband RS, the starting position thereof, etc. through higher layer signaling. By considering RF capabilities of in-coverage UEs, the network may designate the BW for transmitting the wideband RS.

(iii) Wideband RS Sequence

Since a wideband RS should be monitored by all UEs, the wideband RS needs to be scrambled with a common ID (e.g., a cell ID).

Figure 8:
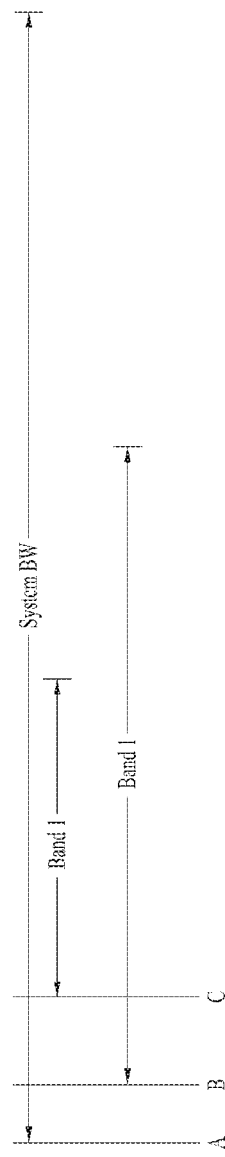
FIG. 8 is a diagram illustrating an RS transmission BW and an RS configuration according to an embodiment of the present disclosure.

FIG. 8 is a diagram illustrating an RS transmission BW and an RS configuration according to an embodiment of the present disclosure.

It is assumed in FIG. 8 that multiple bands (e.g., Band 0 and Band 1) are included in the system BW and each of the bands is allocated to a different UE group.

When an RS is generated to operate in the system BW according to an embodiment of the present disclosure, the network may indicate to UEs in each group the starting point of the system BW (e.g., point A of FIG. 8) or an offset between point A and the starting point of each band (e.g., point B or C). Each UE may estimate an RS sequence within its band based on the starting point and offset in its received RS.

As another example, while managing Band 0 and Band 1, the network may generate an RS based on the BW of Band 1 and then transmit the generated RS. In this case, the network may indicate the starting point of a wideband RS (e.g., the starting point of Band 1) or an offset (e.g., a distance difference between the starting points of Bands 0 and 1). A UE may generate an RS according to the indication and then use the generated RS for demodulation of a control channel (or a data channel).

The generation of an RS sequence and the signaling of a sequence starting point may be applied not only to a wideband RS but also to a narrowband RS. This may be used to maintain orthogonality when orthogonal MU-MIMO is applied in the future. For example, when multiple UEs operating in different bands need to be multiplexed on a common resource, if an RS sequence is generated for each band, it may decrease the orthogonality. Thus, the same sequence starting point needs to be designated.

<2-Symbol Wideband RS>

When the wideband RS is used for the frequency offset adjustment among the above-described wideband RS purposes, one symbol may be inefficient. Thus, an embodiment of the present disclosure proposes to transmit a wideband RS using two symbols. Hereinafter, a transmit diversity scheme when a 2-symbol wideband RS is transmitted will be described.

Figure 9:
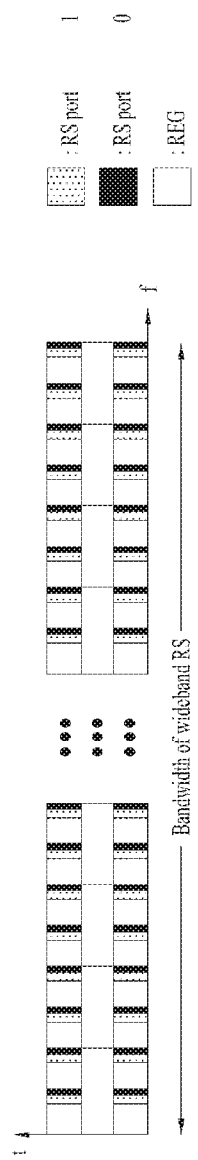
FIG. 9 illustrates a 2-symbol wideband RS according to an embodiment of the present disclosure.

FIG. 9 illustrates a 2-symbol wideband RS according to an embodiment of the present disclosure. The present disclosure is not limited to the 2-symbol wideband RS in FIG. 9, and the location of an RS, the number of RS REs per REG, etc. may vary depending on RS configurations.

When a wideband RS is configured as shown in FIG. 9, a UE may assume that the same precoding is applied to the same antenna port in a wideband RS BW. To apply a transmit diversity scheme such as precoder cycling, the network may signal to the UE a pattern for port selection.

Figure 10:
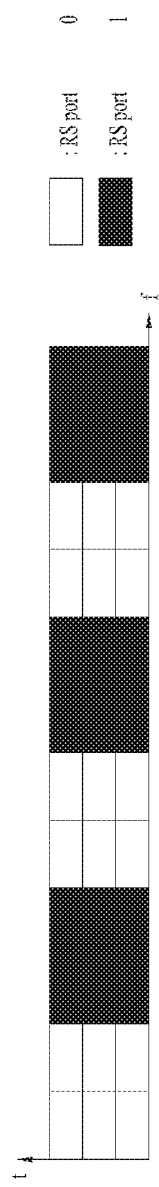
FIG. 10 illustrates an RS pattern according to an embodiment of the present disclosure.

FIG. 10 illustrates an RS pattern according to an embodiment of the present disclosure. For example, when a wideband RS is configured as shown in FIG. 9, a UE should use the RS pattern shown in FIG. 10.

The UE may perform channel estimation for RS port 0 and RS port 1 using the entirety of the wideband RS BW. When the UE intends to perform blind decoding for a control channel, the UE may perform the blind decoding by applying a channel value estimated from an RS port that should be assumed in a corresponding REG. The UE may assume that the same precoding is applied to an RS and data in the same REG. Also, the UE may assume that the same precoding is applied to the same port.

According to an embodiment of the present disclosure, an RS port pattern may be signaled to each UE. In addition, a different pattern may be applied to each CORESET or each symbol to obtain diversity gain.

Figure 11:
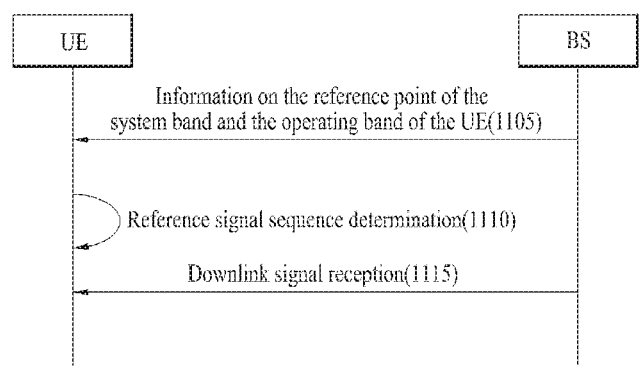
FIG. 11 is a flowchart illustrating an RS transmission and reception method according to an embodiment of the present disclosure.

FIG. 11 is a flowchart illustrating an RS transmission and reception method according to an embodiment of the present disclosure. Redundant description will be omitted.

Referring to FIG. 11, a UE receives information on a reference point of a system band and an operating band of the UE corresponding to a part of the system band from a BS (1105). The information on the reference point of the system band and the operating band of the UE may be received through higher layer signaling. The information on the operating band of the UE may include an offset between the operating band of the UE and the reference point of the system band. The reference point of the system band may be a starting point of the system band.

The UE determines an RS sequence for its operating band with respect to the reference point of the system band (1110). The determined RS sequence may be a partial sequence of a predetermined sequence applied to the entirety of the system band, wherein the partial sequence may be for the operating band of the UE. For example, the UE may determine, as the partial sequence, a part of the predetermined sequence generated with respect to the reference point, wherein the part of the predetermined sequence corresponds to the operating band of the UE specified by the offset.

The UE receives a downlink signal in its operating band based on the determined RS sequence (1115). For example, the UE may measure a downlink RS transmitted in its operating band using the determined RS sequence and then demodulate a control signal or a data signal based on the result obtained by measuring the downlink RS.

Figure 12:
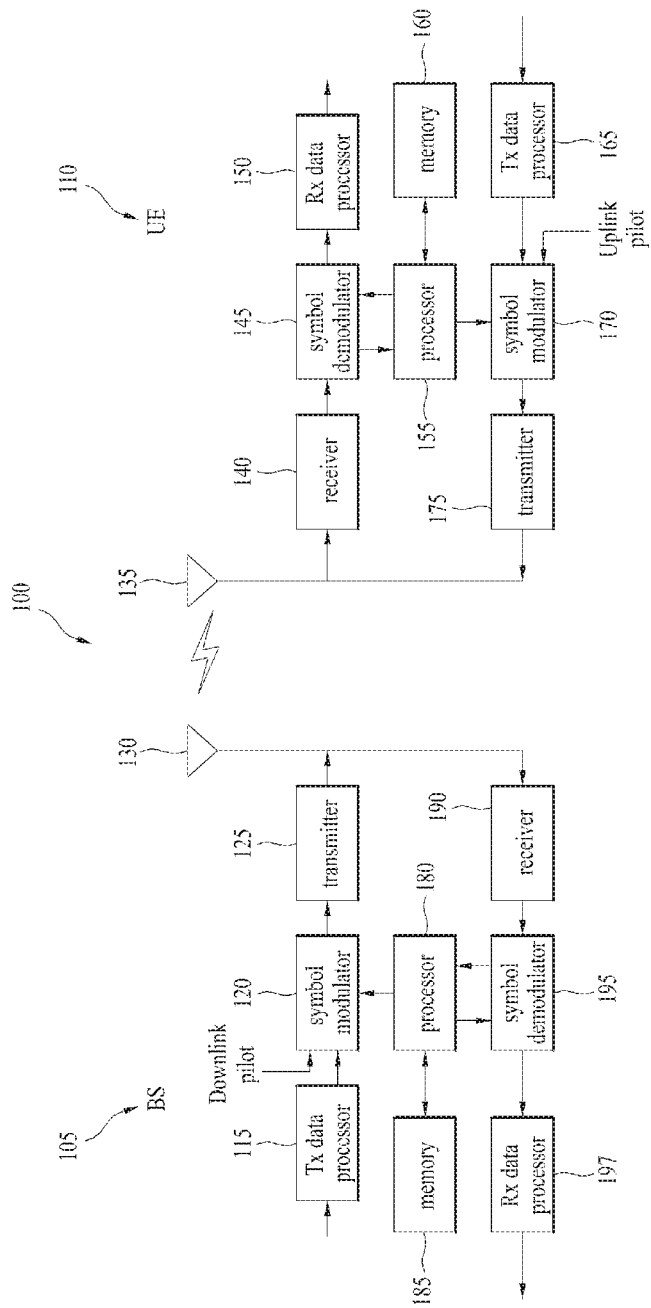
FIG. 12 is a block diagram illustrating a user equipment and a base station according to an embodiment of the present disclosure.

FIG. 12 is a block diagram illustrating the configuration of a BS 105 and a UE 110 in a wireless communication system 100 according to an embodiment of the present disclosure.

While one BS 105 and one UE 110 are shown in the drawing to schematically represent the wireless communication system 100, the wireless communication system 100 may include at least one BS and/or at least one UE.

The BS 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, the UE 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the BS 105/UE 110 are illustrated as including one antenna 130, 135, each of the BS 105 and the UE 110 includes a plurality of antennas. Therefore, each of the BS 105 and the UE 110 of the present disclosure supports a multiple input multiple output (MIMO) system. And, the BS 105 according to the present disclosure may support both the single user-MIMO (SU-MIMO) system and the multi user-MIMO (MU-MIMO) system.

In downlink, the transmission data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In this operation, each of the transmitted symbols may include the data symbol, the pilot symbol or a signal value of zero. In each symbol duration, pilot symbols may be contiguously transmitted. In this operation, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the UE via the antenna 130.

In the configuration of the UE 110, the receiving antenna 135 receives the downlink signal from the BS and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmission data processor 115 in the BS 105, respectively.

In the UE 110 on uplink, the transmission data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the BS 105 via the antenna 135.

In the BS 105, the uplink signal is received from the UE 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the UE 110.

The processor 155/180 of the UE 110/BS 105 directs operations (e.g., control, adjustment, management, etc.) of the UE 110/BS 105. The processor 155/180 may be connected to the memory unit 160, 185 configured to store program codes and data. The memory 160, 185 is connected to the processor 155, 180 to store operating systems, applications and general files.

The processor 155, 180 may be called one of a controller, a microcontroller, a microprocessor, a microcomputer and the like. And, the processor 155, 180 may be implemented using hardware, firmware, software and/or any combinations thereof. In the implementation by hardware, the processor 155, 180 may be provided with such a device configured to implement the present disclosure as application specific integrated circuits (ASICs), digital signal processors (DSPs), digital signal processing devices (DSPDs), programmable logic devices (PLDs), field programmable gate arrays (FPGAs), and the like.

In case of implementing the embodiments of the present disclosure using firmware or software, the firmware or software may be configured to include modules, procedures, and/or functions for performing the above-explained functions or operations of the present disclosure. And, the firmware or software configured to implement the present disclosure is loaded in the processor 155, 180 or stored in the memory 160, 185 so as to be driven by the processor 155, 180.

Layers of a radio protocol between a UE/BS and a wireless communication system (network) may be classified into 1st layer L1, 2nd layer L2 and 3rd layer L3 based on 3 lower layers of open system interconnection (OSI) model well known to communication systems. A physical layer belongs to the 1st layer and provides an information transfer service via a physical channel. Radio resource control (RRC) layer belongs to the 3rd layer and provides control radio resourced between UE and network. A UE and a BS may exchange RRC messages with each other through a wireless communication network and RRC layers.

The above-mentioned embodiments correspond to combinations of elements and features of the present disclosure in prescribed forms. And, it is able to consider that the respective elements or features are selective unless they are explicitly mentioned. Each of the elements or features can be implemented in a form failing to be combined with other elements or features. Moreover, it is able to implement an embodiment of the present disclosure by combining elements and/or features together in part. A sequence of operations explained for each embodiment of the present disclosure can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

While the present disclosure has been described and illustrated herein with reference to the preferred embodiments thereof, it will be apparent to those skilled in the art that various modifications and variations can be made therein without departing from the spirit and scope of the invention. Thus, it is intended that the present disclosure covers the modifications and variations of this invention that come within the scope of the appended claims and their equivalents.

INDUSTRIAL APPLICABILITY

As described above, the present disclosure is applicable to various wireless communication systems.

What is claimed is:

1. A method of receiving a downlink signal by a user equipment (UE) in a wireless communication system, the method comprising:
receiving a reference signal in two symbols;
receiving information on a reference point of a system band and an operating band of the UE corresponding to a part of the system band from a base station;
determining a sequence of the reference signal for the operating band of the UE with respect to the reference point of the system band; and
receiving the downlink signal in the operating band of the UE based on the sequence of the reference signal,
wherein the information on the operating band of the UE comprises an offset between the operating band of the UE and the reference point of the system band,
wherein the reference signal transmitted in the operating band of the UE is measured by using the sequence of the reference signal,
wherein the reference signal is transmitted on a resource where a common search space is configured for the UE,
wherein, based on the reference signal being transmitted on the two symbols through the system band, a same precoding is applied to the same antenna port in the operating band of the UE, and
wherein port patterns of the reference signal applied to each of the two symbols are different.

2. The method of claim 1, wherein the reference point of the system band is a starting point of the system band.

3. The method of claim 1, wherein the sequence of the reference signal is a partial sequence of a predetermined sequence applied to the entirety of the system band, and wherein the partial sequence is for the operating band of the UE.

4. The method of claim 3, wherein determining sequence of the reference signal comprises determining, by the UE, a part of the predetermined sequence generated with respect to the reference point as the partial sequence, and wherein the part of the predetermined sequence corresponds to the operating band of the UE specified by the offset.

5. The method of claim 1, wherein the information on the reference point of the system band and the operating band of the UE is received through higher layer signaling.

6. A method of transmitting a downlink signal by a base station in a wireless communication system, the method comprising:
transmitting, to a user equipment (UE), a reference signal in two symbols;
transmitting, to the UE, information on a reference point of a system band and an operating band of the UE corresponding to a part of the system band;
determining a sequence the reference signal for the operating band of the UE with respect to the reference point of the system band; and
transmitting the downlink signal in the operating band of the UE based on the sequence of the reference signal,
wherein the information on the operating band of the UE comprises an offset between the operating band of the UE and the reference point of the system band,
wherein the reference signal is transmitted on a resource where a common search space is configured for the UE,
wherein, based on the reference signal being transmitted on the two symbols through the system band, a same precoding is applied to the same antenna port in the operating band of the UE, and
wherein port patterns of the reference signal applied to each of the two symbols are different.

7. The method of claim 6, wherein the reference point of the system band is a starting point of the system band.

8. The method of claim 6, wherein the sequence of the reference signal is a partial sequence of a predetermined sequence applied to the entirety of the system band, and wherein the partial sequence is for the operating band of the UE.

9. The method of claim 6, wherein the information on the reference point of the system band and the operating band of the UE is transmitted through higher layer signaling.

10. A user equipment (UE) for receiving a downlink signal in a wireless communication system, the UE comprising:
a receiver; and
a processor configured to:
receive a reference signal in two symbols;
receive information on a reference point of a system band and an operating band of the UE corresponding to a part of the system band from a base station through the receiver;

determine a sequence of the reference signal for the operating band of the UE with respect to the reference point of the system band; and receive the downlink signal in the operating band of the UE based on the sequence of the reference signal through the receiver, wherein the information on the operating band of the UE comprises an offset between the operating band of the UE and the reference point of the system band, wherein the reference signal transmitted in the operating band of the UE is measured by using the sequence of the reference signal, wherein the reference signal is transmitted on a resource where a common search space is configured for the UE, wherein, based on the reference signal being transmitted on the two symbols through the system band, a same precoding is applied to the same antenna port in the operating band of the UE, and wherein port patterns of the reference signal applied to each of the two symbols are different.

11. The UE of claim 10, wherein the reference point of the system band is a starting point of the system band.

12. The UE of claim 10, wherein the sequence of the reference signal is a partial sequence of a predetermined sequence applied to the entirety of the system band, and wherein the partial sequence is for the operating band of the UE.

13. The UE of claim 12, wherein the processor is configured to determine, as the partial sequence, a part of the predetermined sequence generated with respect to the reference point, and wherein the part of the predetermined sequence corresponds to the operating band of the UE specified by the offset.

14. The UE of claim 10, wherein the information on the reference point of the system band and the operating band of the UE is received through higher layer signaling.

15. The UE according to claim 10, wherein the UE is capable of communicating with at least one of another UE, a UE related to an autonomous driving vehicle, a base station or a network.

* * * * *